I. TOWER.
Fruit-Gatherer.
No. 69,144.
Patented Sept. 24, 1867.
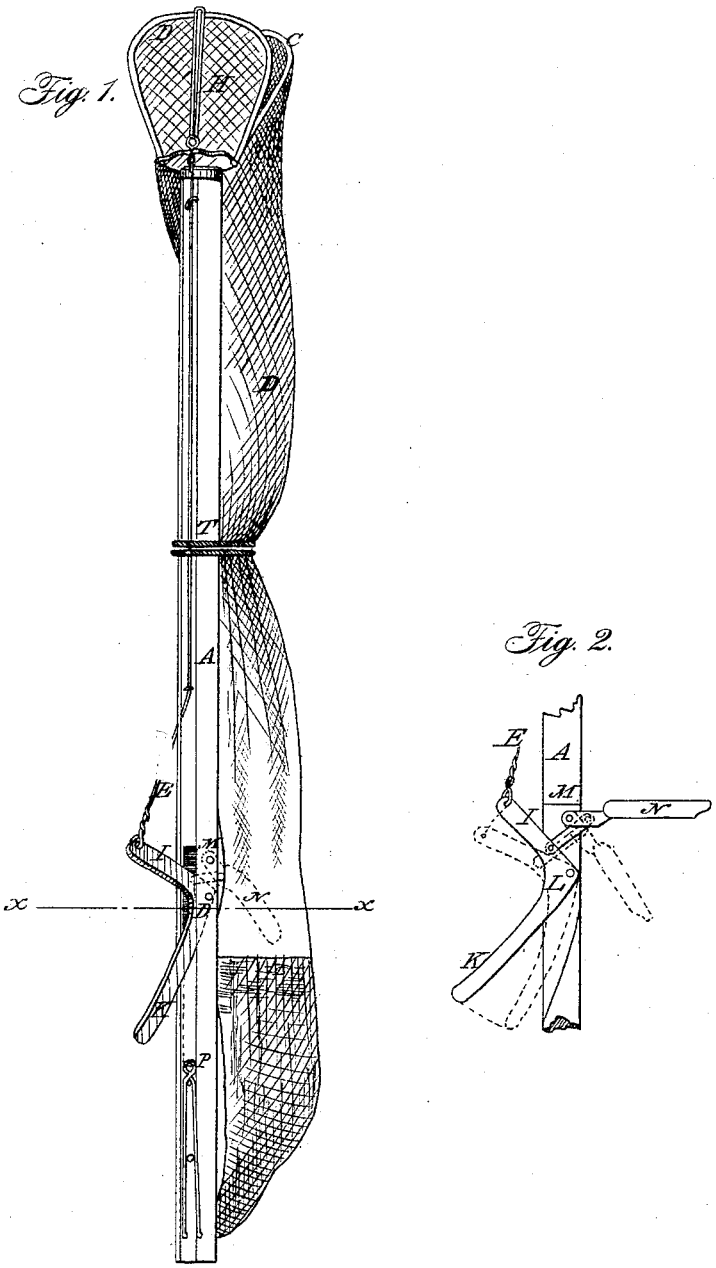
Witnesses:
Inventor:

United States Patent Office.

IBROOK TOWER, OF MILFORD, MICHIGAN.

*Letters Patent No. 69,144, dated September 24, 1867.*

---

IMPROVEMENT IN FRUIT-PICKERS.

---

The Schedule referred to in these Letters Patent and making part of the same.

---

TO WHOM IT MAY CONCERN:

Be it known that I, IBROOK TOWER, of Milford, in the county of Oakland, in the State of Michigan, have invented a new and useful Improvement in Fruit-Gatherers; and I do declare that the following is a true and accurate description thereof, reference being had to the accompanying drawings, and to the letters of reference marked thereon, making a part of this specification.

Figure 1 is a front view of my invention with jaws or frames partially closed.

Figure 2 is a horizontal sectional view of the same through the line $x\ x$ in fig. 1.

The same letters of reference indicate similar parts in each figure.

The object of this invention is to enable persons desirous of picking choice fruit to do so without the use of ladders or frames, and deliver the fruit on the ground without being bruised.

To enable those skilled in the art to make and use my invention, I will now so describe it that in connection with the drawings there will be no difficulty.

I first make a rod or standard, A, of suitable length to enable the operator to stand upon the ground and reach the fruit on any part of the tree. Upon the top of this rod or standard A I fasten a proper wire frame, B, covered with cotton or any other suitable cloth. This frame B is an elongation of the rod A, and firmly attached thereto. I then make another wire frame, C, from which is suspended the bag or conductor D. The frame C is attached by a suitable device to the frame B in such a manner as to allow the frame C to be closed upon the frame B and grasp the fruit to be picked. The frame C is closed, as described, by means of the connecting-wire or cord E attached at the upper end to the lever F, which is attached to and forms a part of the frame C. H is a suitable spring, of rubber or other material, attached at its upper end to the frame B, and at its lower end to the lever F. The lower end of the connecting-wire or cord E is attached to the arm I, which is operated by the thumb-piece K. The arm I and thumb-piece K are made solid, so that they are really but one piece, and at the elbow are inserted into a proper slot in the rod A and hung upon the fulcrum-pin L. At M is another fulcrum, upon which is hung the padded or cushioned arm N. This arm N is designed to break the fall of the fruit through the bag or conductor, and should be sufficiently padded with elastic material as to insure the fruit from being bruised by falling upon it. This arm N is attached by a suitable device to the arm I and thumb-piece K, and is governed, controlled, and worked by them. By depressing the thumb-piece K the connecting-wire or cord draws upon the lever F and closes the frame C upon the frame B and plucks the fruit, which passes down the bag or conductor. By releasing the thumb-piece at the instant the fruit has been plucked, the cushioned arm is thrown out at right angles with the rod or standard, and stops the fruit without bruising it. This arm N works inside the bag or conductor. Repeating the operation just described, the arm N is dropped alongside the rod or standard A, when the fruit is released and allowed to pass into the lower end of the bag or conductor. The lower end of the bag is made open, with a gathering-string in the hem of the bottom. When in use this gathering-string O is drawn up, (closing the end of the bag,) and passing through proper openings in the rod or standard is fastened to the pin or hook P. When the lower end of the bag is full and requires emptying, by unloosening the string O the bottom of the bag is opened and the fruit discharged. T is a corrugated India-rubber band, which, passing around the rod and conductor, breaks the fall of the fruit, and at the same time expands and allows it to fall through.

What I claim as my invention, and desire to secure by Letters Patent, is—

1. The cushioned arm N, or its equivalent, for the purpose designed.

2. The combination and arrangement of the cushioned arm N with the other parts of a fruit-picker, arranged substantially as described for the purpose designed.

IBROOK TOWER.

Witnesses:
P. F. WELLS,
D. W. WELLS.